COSMETIC MAKE-UP DEVICE WITH REPLACEABLE COSMETIC QUILL HAVING LUBRICATED SIDE WALLS

Filed Jan. 8, 1962 3 Sheets-Sheet 1

INVENTOR.
ROBERT GORDON BAU
BY
R. E. Geauque
ATTORNEY

June 21, 1966 R. G. BAU 3,256,980

COSMETIC MAKE-UP DEVICE WITH REPLACEABLE COSMETIC QUILL HAVING LUBRICATED SIDE WALLS

Filed Jan. 8, 1962 3 Sheets-Sheet 2

INVENTOR.
ROBERT GORDON BAU

BY R. E. Geauque

ATTORNEY

INVENTOR.
ROBERT GORDON BAU
BY R. E. Geauque
ATTORNEY

United States Patent Office 3,256,980
Patented June 21, 1966

3,256,980

COSMETIC MAKE-UP DEVICE WITH REPLACEABLE COSMETIC QUILL HAVING LUBRICATED SIDE WALLS

Robert Gordon Bau, 3271 Laurel Canyon, North Hollywood, Calif.

Filed Jan. 8, 1962, Ser. No. 164,834
1 Claim. (Cl. 206—56)

This invention relates to a cosmetic make-up device and more particularly to a new and useful cosmetic make-up device for dispensing wax and oil base cosmetics of relatively soft composition.

A brush is considered the best device for applying lipstick to outline the lips in a sharp, distinct line; however, the brush is more inconvenient to use than conventional lipstick devices. Thinline lipsticks have been made with a view toward making a sharper outline on the lips, but this type of lipstick is not entirely satisfactory because it is easily broken. Attempts have been made to overcome this problem by providing a dispenser which supports the thinline lipstick over all of its length except that portion which is applied to the lips, but this has not been satisfactory because the frictional drag between the interior walls of the dispenser and the cosmetic prevents satisfactory propelling and retracting of the lipstick and the unsupported portion of the lipstick breaks or smears in use. Therefore, the usual lipstick dispensing device provides substantial clearance between the lipstick and the casing. This necessitates casting the molten cosmetic into a mold, letting the cosmetic solidify, removing it, mounting it in a cup, mounting the cup in a dispenser, and then treating the lipstick in a flame to produce a pleasing luster. This method of manufacture is not only time consuming, but results in a lipstick device wherein the cosmetic wobbles, bends and breaks easily because it is not supported by the wall of the dispenser. Furthermore, wax and oil base cosmetics become brittle in cold weather and soft in hot weather. These physical characteristics make it apparent that it is impossible to satisfactorily use such a cosmetic in the form of a thin stick without supporting it.

In view of the foregoing factors and conditions characteristic of dispensing devices for wax and oil base cosmetics of relatively soft composition, it is a primary object of the present invention to provide a new and improved cosmetic dispensing device which is not subject to the disadvantages enumerated above, which has a casing or quill supporting the cosmetic over its entire length and resembling a brush in use, which is lubricated in such a manner that a cosmetic of soft composition may be propelled and retracted without damage thereto, and which may be conveniently manufactured by pouring molten cosmetic directly into the dispensing device.

Another object of the invention is to provide an improved quill for a cosmetic dispenser which is adapted for the sharp outlining of the facial area of application thereof.

A further object of the invention is to provide a cosmetic dispenser of the type described having an improved propelling mechanism including a double acting drive wherein an inner drive propels the cosmetic until a first portion of it is used and an outer, visual drive propels the cosmetic until the balance of it is used.

Still another object of the invention is to provide a shaped quill for a cosmetic device of the type described, wherein the interior walls of the casing have a low coefficient of friction and are lubricated.

Still other more specific objects will appear upon reading the following specification and claim and upon considering in connection therewith the attached drawings to which they relate.

Referring now to the drawings in which preferred embodiments of the invention are illustrated:

Figure 1:
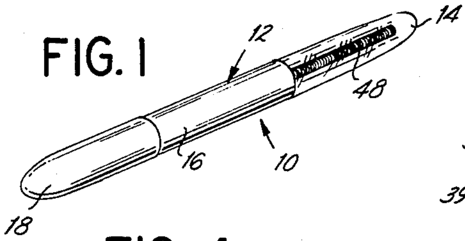
FIGURE 1 is a perspective view of one embodiment of a cosmetic dispensing device of the present invention with its end cap in position covering the exposed portion of the cosmetic.
Figure 2:
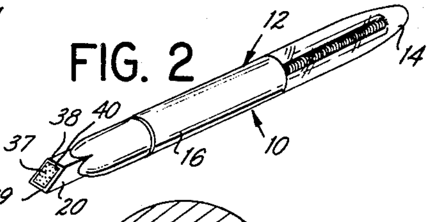
FIGURE 2 is a perspective view of the cosmetic device of FIGURE 1 with its end cap removed.
Figure 4:
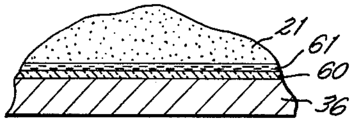
FIGURE 4 is an enlarged, cross-sectional view of the portion of the device of FIGURE 3 enclosed in the circle identified by the numeral 4.
Figure 5:
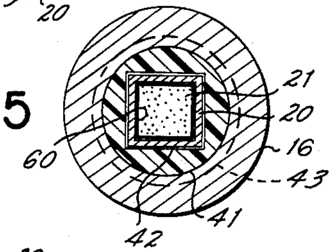
FIGURE 5 is a transverse cross-sectional view taken along line 5—5 of FIGURE 3.

Referring again to the drawings, and particularly to FIGURES 1–8, a cosmetic make-up dispensing device constituting one embodiment of the present invention, generally designated 10, includes a housing 12 having a bottom portion 14, a tubular, intermediate portion 16 and a removable cap 18. The housing 12 houses a quill 20 containing a wax and oil base cosmetic 21 of relatively soft composition, such, for example, as lipstick, and a cosmetic propelling mechanism 22.

The bottom portion 14 includes a cylindrical neck 23, a bore 24 and a serrated recess 26. The cylindrical neck 23 is of reduced cross section so that it defines a first shoulder 27 with the bottom portion 14. A second shoulder 28 may then be formed by undercutting the first shoulder 27. A first collar 30 is rotatably mounted on the neck 23 abutting the first shoulder 27 and a second collar 31 is of slightly smaller diameter and circumference than collar 30 and is pressed onto the neck 23 abutting the first collar 30.

The tubular, intermediate portion 16 has internal threads 34 at one end and is open at its other end. The open end abuts the second shoulder 28 and frictionally engages the first collar 30 but is free to revolve about the second collar 31, thereby making it possible to grip the intermediate portion 16 and rotate the bottom portion 14.

Figure 10:
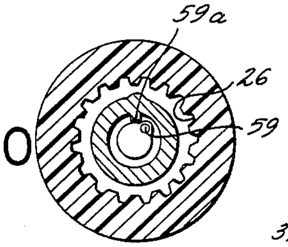
FIGURE 10 is a transverse cross-sectional view taken along line 10—10 of FIGURE 7.
Figure 11:
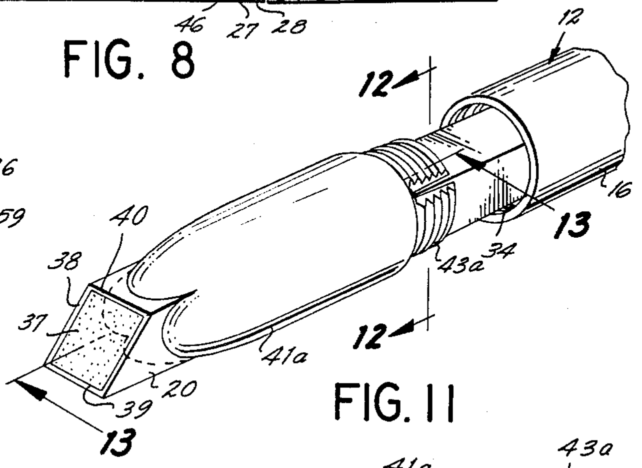
FIGURE 11 is a perspective view of a portion of the cosmetic device of FIGURE 1 illustrating a modified form of one of its component parts.
Figure 12:
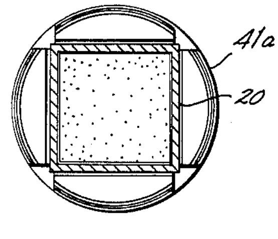
FIGURE 12 is a transverse cross-sectional view taken along line 12—12 of FIGURE 11.
Figure 13:
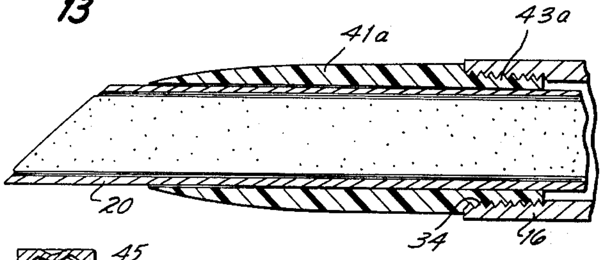
FIGURE 13 is a longitudinal cross-sectional view taken along line 13—13 of FIGURE 11.
Figures 14, 24, 25, 26, 27:
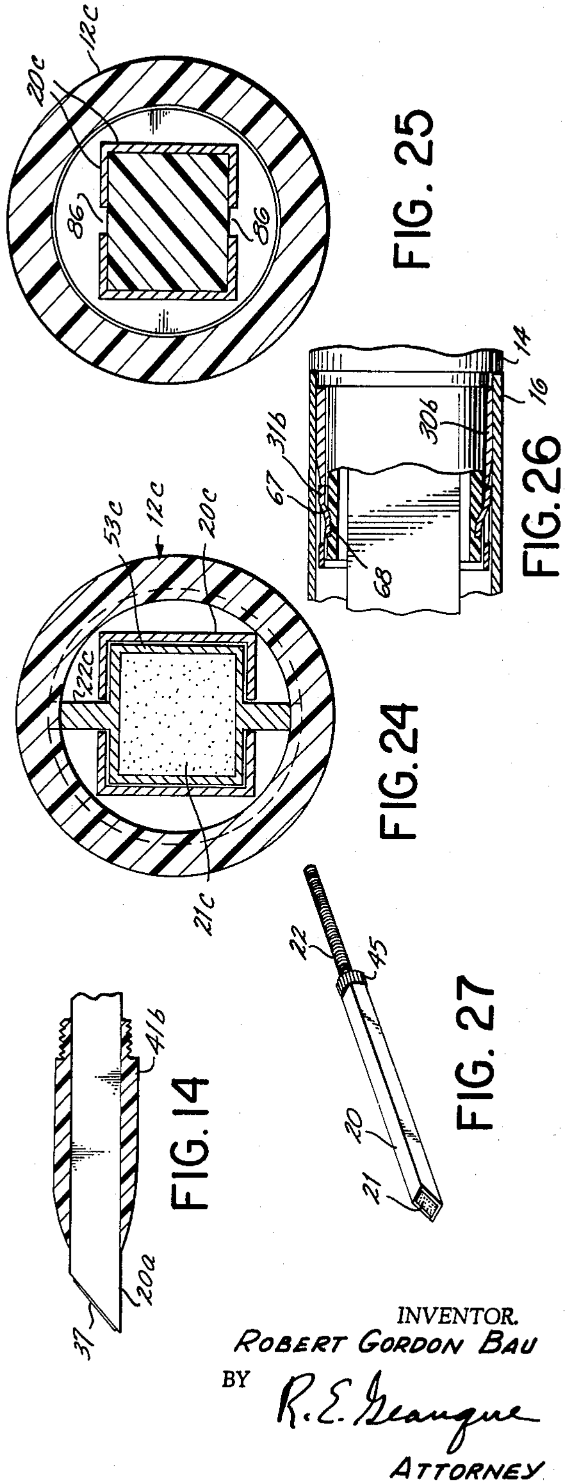
FIGURE 14 is a longitudinal cross-sectional view of a portion of the cosmetic device of FIGURE 1 illustrating a modified form of one of its component parts.
FIGURE 24 is a transverse cross-sectional view taken along line 24—24 of FIGURE 23.
FIGURE 25 is a transverse cross-sectional view taken along line 25—25 of FIGURE 23.
FIGURE 26 is an elevational view of a portion of the cosmetic device of FIGURE 1 with parts broken away to show a modified detail of construction.
FIGURE 27 is a perspective view of a refill cartridge for the cosmetic dispensing device of FIGURE 3.

Although the quill 20 may be made in any suitable shape, it will be described in detail in connection with the square shape shown in FIGURES 1–16. FIGURES 18–22 are illustrative of other shapes which have been found to be satisfactory. The square quill 20 includes an encompassing sidewall 36 which is open at both ends. As best seen in FIGURE 11, the forward end of quill 20 is cut on an angle, preferably 45°, to define an opening 37 having bevelled peripheral edges 38. The lower edge 39 protrudes forwardly of the upper edge 40. The quill 20 is non-rotatably retained in the housing 12 by means of a nib 41 having a throughgoing rectangular bore 42 and an externally threaded collar 43 which threadedly engages the threads 34 of intermediate portion 16. The nib 41 shown in FIGURE 3 fits loosely on the quill 20 and is prevented from sliding too far down the quill by means of a protuberance 44 on sidewall 36. The nib **41*a* shown in FIGURES 11–13 has a split, threaded collar 43*a* threadedly engaging threads 34 of housing 12 to compress the collar 43*a* and retain it in position on quill 20. The nib 41*b* shown in FIGURE 14 is an integral part of a quill 20*a***.

Figures 3, 6, 9:
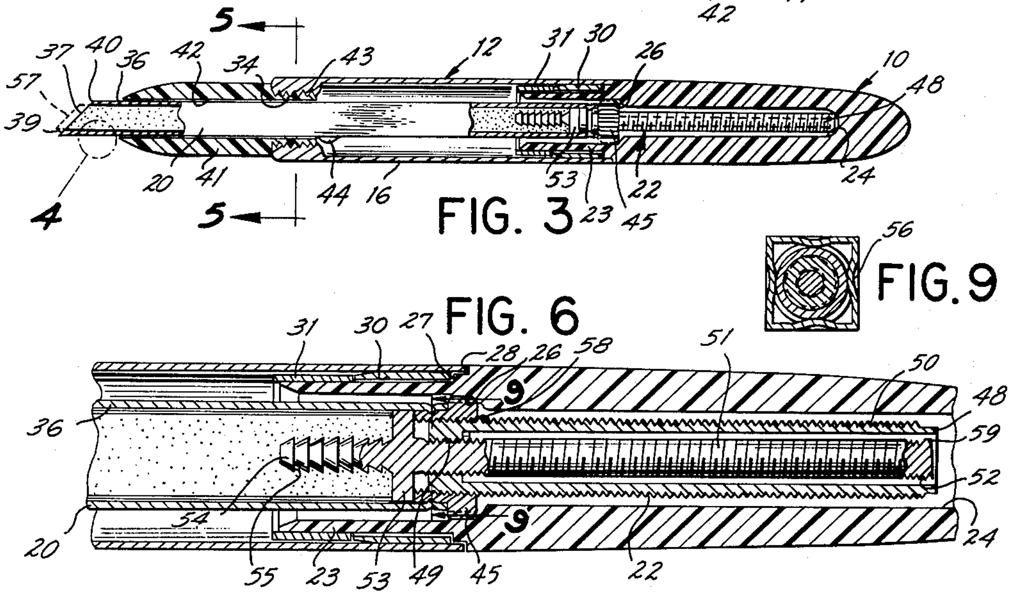
FIGURE 3 is longitudinal cross-sectional view of the cosmetic device of FIGURE 2 with parts shown in elevation.
FIGURE 6 is an enlarged cross-sectional view of the drive mechanism of the cosmetic device of FIGURE 1 showing a first condition of operation.
FIGURE 9 is a transverse cross-sectional view taken along line 9—9 of FIGURE 6.
Figures 15, 16:
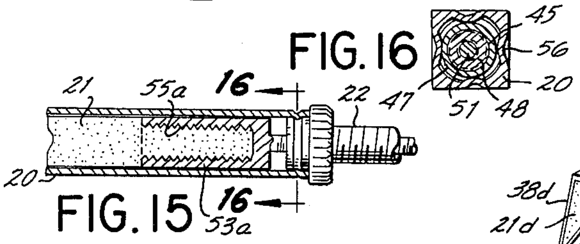
FIGURE 15 is a longitudinal cross-sectional view of a portion of the cosmetic device of FIGURE 1 illustrating a modified drive mechanism.
FIGURE 16 is a transverse cross-sectional view taken along the line 16—16 of FIGURE 15.

The cosmetic propelling mechanism 22 includes an internally threaded gear 45 having an annular shoulder 46 which, in turn, has a groove 47 encircling its midportion. The gear 45 seats in the serrated recess 26. A first shaft 48 having internal threads 49 and external threads 50 threadedly engages the internal threads of the gear 45. A second shaft 51 having external threads 52 threadedly engages internal threads 49 of the first shaft 48. The second shaft 51 includes a base plate 53 which is shaped to closely fit the interior walls 36 of the quill 20 and a third shaft 54 having conical projections 55. The quill 20 is rotatably connected to shoulder 46 of the gear 45 by crimping the lower end of the sidewall 36 of quill 20 to form indentations 56 which engage the groove 47 of shoulder 46 (FIGURES 9 and 16). When the unit is thus assembled, the quill 20 may be filled with molten cosmetic which is prevented from flowing out the bottom of the quill 20 by the base plate 53. It is apparent that this double shaft arrangement permits making a short, compact cosmetic dispensing device. For example, should a single shaft be employed to propel the cosmetic forwardly within quill 20, it would require a three inch shaft to propel a three inch stick of cosmetic resulting in a dispensing device at least six inches long. The double shaft arrangement of the present invention, on the other hand, permits using a three inch stick of cosmetic in a dispenser having an overall length of four and one-half inches.

Figure 7:
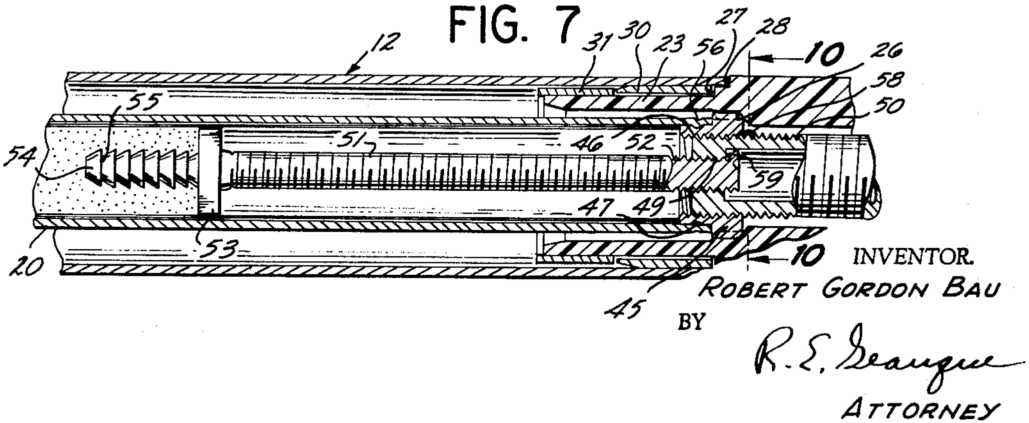
FIGURE 7 is an enlarged cross-sectional view of the drive mechanism of the cosmetic device of FIGURE 1 showing a second condition of operation.
Figure 8:
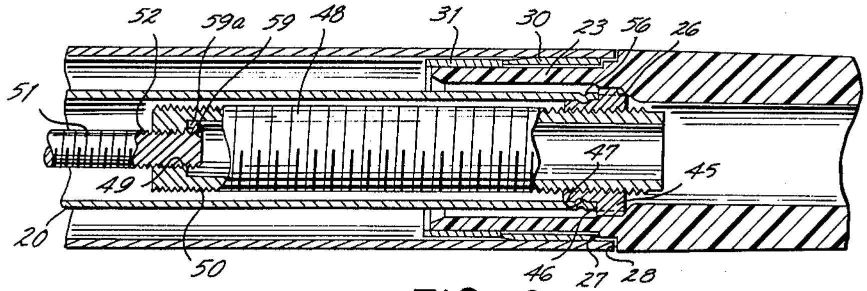
FIGURE 8 is an enlarged cross-sectional view of the drive mechanism of the cosmetic device of FIGURE 1 showing a third condition of operation.

The propelling mechanism 22 is provided with left-hand threads so that the cosmetic 21 will be propelled forwardly by rotating the lower portion 14 of housing 12 in a clockwise direction, as is customary in conventional cosmetic devices. The threads 49, 50 and 52 are all given a pitch of 56 threads to the inch so that one turn of the bottom portion 14 will expose one application of cosmetic at the opening 37 of the quill 20, as shown in greatly exaggerated form at 57 in FIGURE 3. A plastic seal 58 cements the gear 45 to the first shaft 48 in such a manner that the shaft 48 does not rotate within the gear 45 until sufficient resistance is met to break the seal 58. Since the second shaft 51 is prevented from rotating by the base plate 53, rotation of the shaft 48 while being constrained by the seal 58 causes the internal threads 49 of shaft 48 to move the second shaft 51 forwardly in the quill 20. When the second shaft 51 reaches the end of its travel, it is prevented from further movement by a lug 59 which is stopped by a projection **59*a*, as shown in FIGURES 7 and 10. Continued rotation of the lower portion 14 will then break the seal 58 permitting the first shaft 48 to advance forwardly through the internal threads of the gear 45. The length of the shaft 48 and 51 is such that one half the cosmetic 21 will be dispensed by the time the second shaft 51 reaches the limit of its travel and the second half of the cosmetic 21 will be dispensed by the time the first shaft 48** reaches the end of its travel, as shown in FIGURE 8.

This indicates that quill 20 needs refilling.

The conical projections 55 pull the cosmetic back into the quill 20 when the bottom portion 14 is rotated in a counterclockwise direction. The first shaft 48 is kept from becoming unthreaded from the gear 45 when the propelling mechanism 22 is retracting the cosmetic 21 by striking the bottom of the bore 24 in the bottom portion 14.

The bottom portion 14 of the housing 12 may be made of transparent material so that the first shaft 48 will be visible to serve as a gauge indicating the amount of cosmetic 21 remaining in the quill 20. That is, once the first shaft 48 starts moving forwardly into the gear 45, it is apparent that half the cosmetic 21 has been used and that the shaft 48 will begin to disappear into the intermediate portion 16 of the housing 12. The exposed length of the second shaft 48 will then correspond to the length of the cosmetic 21 remaining in the quill 20.

The quill 20 includes a liner 60 (FIGURE 4) having a low coefficient of friction to minimize drag between the cosmetic 21 and the sidewall of quill 20. Also, this drag is virtually eliminated by coating the liner 60 of the quill 20 with a suitable liquid lubricant 61. One such lubricant that works satisfactorily is a cosmetic grade of silicone, such as No. 200 Dow Silicone. The liner 60 may comprise strips of tetrafluoroethylene resin, such as sold by Du Pont under the trademark "Teflon," which may be cemented to the interior walls of the quill 20 or the liner 60 may be applied by dipping the quill 20 into a 2% solution of No. 200 Dow Silicone using carbon tetrachloride as a base and then baking the quill 20 for one hour at a temperature of 300° F.

Figure 17:
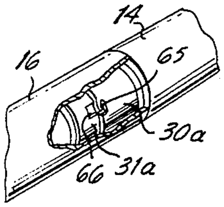
FIGURE 17 is a perspective view of a portion of the cosmetic device of FIGURE 1 with parts broken away to show a modified detail of construction.

Referring to FIGURE 17, a first collar **30*a* and a second collar 31*a* are used in place of the collars 30 and 31. The collar 30*a* includes a projection 65 adapted to strike a clip 66 mounted on the second collar 31*a*. Since the collar 30*a* rotates on the neck 23 while the collar 31*a* frictionally engages the neck 23, each revolution of the bottom portion 14 will produce an audible click when the projection 65 strikes the clip 66. This in an indication to the user of the cosmetic device that sufficient cosmetic is exposed for one application because, as previously pointed out, one turn of the threads on the shafts 48** and 51 exposes the correct amount of cosmetic for one application.

FIGURE 26 shows a further modification of the collars 30 and 31, wherein the second collar 31*b* includes two inwardly sprung ears 67 which engage two recesses 68 on the neck 23. This permits the collar 31*b* to be assembled without a press fit.

FIGURE 15 illustrates a cup 53*a* having internal threads 55*a* which may be used in place of the base plate 53 and the conical projections 55 to grip the cosmetic 21 for purposes of propelling and retracting it.

Figure 18:
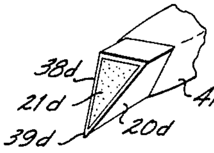
FIGURE 18 is a perspective view of a triangularly shaped quill which may be used in place of the square quill of the cosmetic device of FIGURE 1.

FIGURE 18 illustrates a triangular quill 20*d* which may be secured to a housing 12, not shown, by means of a nib 41*d*. The pointed, lower edge 39*d* is adapted to produce a very thin line for outlining purposes. The peripheral edges 38*d* are bevelled to facilitate applying the cosmetic 21*d* to the facial area of a user of the device.

Figure 19:
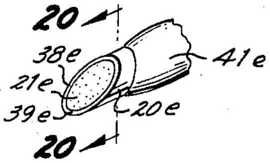
FIGURE 19 is a perspective view of an oval shaped quill which may be used in place of the square quill of the cosmetic device of FIGURE 1.
Figure 20:
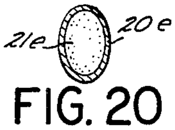
FIGURE 20 is a transverse cross-sectional view taken along line 20—20 of FIGURE 19.

FIGURES 19 and 20 illustrate a quill 20*e* having an oval shape and bevelled peripheral edges 38*e*. The lower edge 39*e* defines a sharp edge for outlining work. The quill 20*e* may be retained in a housing, not shown, by means of a nib 41*e*.

Figure 21:
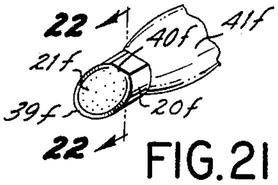
FIGURE 21 is a perspective view of a round quill which may be used in place of the square quill of the cosmetic device of FIGURE 1.
Figure 22:
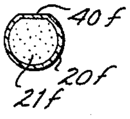
FIGURE 22 is a transverse cross-sectional view taken along line 22—22 of FIGURE 21.

FIGURES 21 and 22 show a circular quill 20*f* having a flat, upper edge 40*f* and an arcuate lower edge 39*f*. The flat upper edge 40*f* prevents rotation of the cosmetic 21*f* within the quill 20*f*. The quill 20*f* may be retained in a housing, not shown, by means of a nib 41*f*.

Figure 23:
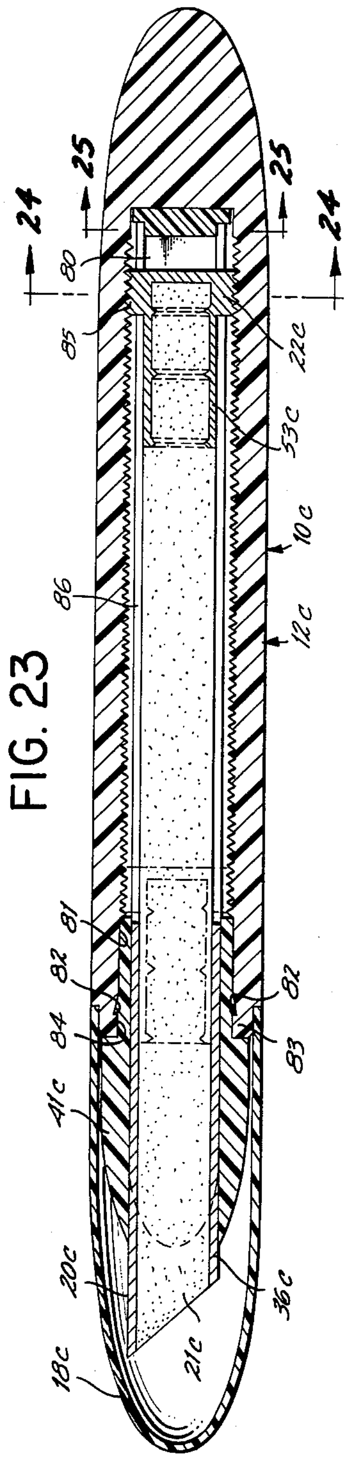
FIGURE 23 is a longitudinal cross-sectional view of a second embodiment of a cosmetic device of the invention.

Referring now to FIGURES 23–25 wherein another embodiment of the invention is shown, a cosmetic dispenser device, referred to generally as 10*c*, is designed to be cheaply constructed so that the entire device may be disposed of after the cosmetic has been used. The cosmetic dispensing device 10*c* includes a housing 12*c* having an internally threaded bore 80 adapted to house a quill 20*c* and a propelling mechanism 22*c*. The housing 12*c* has a sloped inner wall 81 extending from the upper extremity of the bore 80 to an undercut portion 82 defining an interior, annular collar 83 which engages a groove 84 in a nib 41*c* so that the nib 41*c* and the housing 12*c* may be rotated relative to each other.

The propelling mechanism 22*c* includes a cosmetic cup 53*c* having outwardly-extending, threaded projections 85 which threadedly engage the threaded bore 80 and are slidably mounted in longitudinal slots 86 cut into the sidewall 36*c* of the quill 20*c*. Since quill 20*c* is prevented from rotating within the housing 12*c* by the nib 41*c*, the housing 12*c* may be rotated while nib 41*c* is held fast and the cup 53*a* made to advance along the threads of bore 80.

A premolded cosmetic 21*c* may be slid into the quill 20*c* and seated in the cup 53*c* so that it may be propelled and retracted by the cup 53*c*. A removable cap 18*c* may be employed to cover the exposed end of quill 20*c* and the interior walls of the quill 20*c* may be coated and lubricated as described in connection with the other embodiment of the invention.

In both embodiments of the invention it is possible to use lipsticks of less than one-fourth inch diameter, in the case of round quills, or one-fourth inch square, in the case of the square quills. In the prior art practice, on the other hand, lipsticks customarily run about one-half inch in diameter to minimize breakage. Some thinline lipsticks of approximately three-eights inch diameter are available, but are not widely used.

In FIGURE 27, the quill 20 and propelling mechanism 22 are shown in the form of an assembled unit 20–22 which may be used as a refill cartridge.

Use of the cosmetic device will be readily understood and will be explained in connection with the first embodiment of the invention as used for dispensing lipstick. Referring to FIGURE 3, the intermediate portion 16 of the housing 12 is grasped restraining the housing 12 from rotation. The bottom portion 14 of the housing 12 is then rotated 1 turn in a clockwise direction, when viewing the housing 12 from the rear. This exposes a quantity of lipstick 57 which is sufficient for one application to the lips of the user. The lipstick device may then be grasped at any convenient point, such as the nib 41, in such a manner that the exposed lipstick 57 may be applied to the lips of the user while the lower edge 39 of the quill 20 is superjacent the particular lip to be outlined so that the portion of the sidewall 36 extending from the leading edge 39 back to a point subjacent the upper edge 40 supports the exposed portion 57 and keeps it from breaking when pressure is applied thereto while applying lipstick to the lips. The lips are stroked in much the same manner as they are when lipstick is applied with a brush. The lower edge 39 may be used to make a sharp outline and then the entire surface of the exposed portion 57 may be brought to bear on the lips to fill in after they have been outlined. Since the peripheral edges 39 of the quill 20 are bevelled, only a very small amount of lipstick 57 need be exposed, thereby minimizing the chances of the fragile lipstick 21 breaking and also facilitating applying a sharp outline. Should any lipstick 21 remain exposed at 57 after the lips have been made-up, the bottom portion 14 of housing 12 may be rotated counterclockwise retracting the lipstick 21 back into the quill 20. Cap 18 may be then replaced to protect exposed end 37 of the quill 20. When the first shaft 48 approaches the position shown in FIGURE 8, as viewed through the transparent bottom portion 14, it is apparent that the lipstick 21 needs replenishing. This may be accomplished by replacing the quill 20 and propelling mechanism 22 as a single unit. This is done by grasping the nib 41 and the intermediate portion 16 of housing 12 and rotating them in opposite directions to remove the nib 41. The assembly comprising the quill 20 and the propelling mechanism 22 may then be lifted from the housing 12 and replaced with a new unit which is full of lipstick 21. The nib 41 is threaded back into the intermediate portion 16 and the lipstick device 10 is again ready for use. It is very desirable to make the assembled unit 20–22 so that they may be easily replaced as a unit because then the housing 12 and cap 18 may be jeweled or expensively decorated and retained for use over and over again. It is also desirable to make the bottom portion 14 transparent and to impart a color to the first shaft 48 which matches the shade of lipstick 21 to facilitate the selection of the proper refill unit to use for particular occasions. This is in line with the current practice of employing a number of different shades of lipstick in a single day to enhance the different modes of dress of the user of the lipstick device throughout the day.

While the particular cosmetic make-up dispensing devices herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claim.

I claim:

A device for dispensing stick-type cosmetics of relatively soft composition comprising:

an open-topped housing having a transparent closed bottom portion and an intermediate portion;

said bottom portion including a bore and a serrated recess;

said intermediate portion having one end rotatably connected to said bottom portion and having internal threads at its other end;

a cosmetic propelling mechanism mounted in said bore and including a first shaft having internal and external threads, a second shaft threadedly engaging the internal threads of said first shaft and having a base plate mounted on one end thereof, an internally threaded gear threadedly engaging said external threads of said first shaft, having teeth engaging the serrations of said serrated recess and including an annular shoulder;

a cosmetic containing quill of uniform cross-section slidably mounted on said base plate and having one end rotatably mounted on said annular shoulder of said gear, the other end of said quill extending outside of said housing through the said other end of said intermediate portion, said baseplate including means for retracting said cosmetic into said quill; and a nib encompassing the said other end of said quill and threadedly engaging the internal threads of said intermediate portion, said nib being adapted to prevent rotation of said quill.

References Cited by the Examiner

UNITED STATES PATENTS

| | | | |
|---|---|---|---|
| 1,671,393 | 5/1928 | Zantow. | |
| 1,990,031 | 2/1935 | Janer. | |
| 2,275,311 | 2/1942 | Wehn. | |
| 2,344,060 | 3/1944 | Ray. | |
| 2,457,342 | 12/1948 | Braselton. | |
| 2,461,790 | 2/1949 | Vaughn | 132—88.7 |
| 2,507,928 | 5/1950 | Onley | 120—13 |
| 2,546,195 | 3/1951 | Mellette. | |
| 2,552,903 | 5/1951 | Natalicchio. | |
| 2,595,635 | 5/1952 | Braselton. | |
| 2,607,342 | 8/1952 | Abel. | |
| 2,720,965 | 10/1955 | Davis. | |
| 2,814,296 | 11/1957 | Everett. | |
| 2,871,141 | 1/1959 | Van Deusen | 117—97 |
| 2,885,248 | 5/1959 | White. | |

FOREIGN PATENTS

| | | |
|---|---|---|
| 962,333 | 12/1949 | France. |
| 453,992 | 12/1949 | Italy. |

RICHARD A. GAUDET, *Primary Examiner.*

LOUIS J. DEMBO, *Examiner.*

V. DINICOLA, R. L. FRINKS, *Assistant Examiners.*